US008879388B2

(12) United States Patent
Lund

(10) Patent No.: US 8,879,388 B2
(45) Date of Patent: Nov. 4, 2014

(54) METHOD AND SYSTEM FOR INTRUSION DETECTION AND PREVENTION BASED ON PACKET TYPE RECOGNITION IN A NETWORK

(75) Inventor: Martin Lund, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1637 days.

(21) Appl. No.: 11/442,850

(22) Filed: May 30, 2006

(65) Prior Publication Data

US 2007/0280106 A1    Dec. 6, 2007

(51) Int. Cl.
*H04L 1/00* (2006.01)
*H04L 12/26* (2006.01)
*H04L 29/06* (2006.01)

(52) U.S. Cl.
CPC ........ *H04L 63/1416* (2013.01); *H04L 63/1458* (2013.01); *H04L 63/1408* (2013.01); *H04L 63/1441* (2013.01); *H04L 2463/141* (2013.01)
USPC ........................................................ 370/235

(58) Field of Classification Search
CPC ............ H04L 63/1458; H04L 63/1416; H04L 63/1441; H04L 63/1408
USPC ......................................... 370/235, 252, 389
See application file for complete search history.

(56) References Cited

U.S. PATENT DOCUMENTS

| | | | |
|---|---|---|---|
| 6,041,053 A * | 3/2000 | Douceur et al. ............... | 370/389 |
| 6,763,394 B2 * | 7/2004 | Tuck et al. .................... | 709/238 |
| 6,876,653 B2 * | 4/2005 | Ambe et al. ................... | 370/389 |
| 6,980,555 B2 * | 12/2005 | Mar .......................... | 370/395.21 |
| 7,133,400 B1 * | 11/2006 | Henderson et al. ........... | 370/389 |
| 7,200,684 B1 * | 4/2007 | Schales et al. ................ | 709/252 |
| 7,215,637 B1 * | 5/2007 | Ferguson et al. ........... | 370/230.1 |
| 7,251,218 B2 * | 7/2007 | Jorgensen ..................... | 370/235 |
| 7,260,102 B2 * | 8/2007 | Mehrvar et al. ............... | 370/412 |
| 2003/0031208 A1 * | 2/2003 | Anehem et al. ............... | 370/474 |
| 2003/0053474 A1 * | 3/2003 | Tuck et al. .................... | 370/422 |
| 2003/0161303 A1 * | 8/2003 | Mehrvar et al. ............... | 370/386 |
| 2004/0258067 A1 * | 12/2004 | Irish et al. .................... | 370/392 |
| 2005/0010685 A1 * | 1/2005 | Ramnath et al. ............. | 709/238 |
| 2005/0060418 A1 * | 3/2005 | Sorokopud .................... | 709/230 |
| 2005/0157647 A1 * | 7/2005 | Sterne et al. .................. | 370/235 |

OTHER PUBLICATIONS

Householder, "Denial of Service may be Indistinguishable from a Heavy (but otherwise legitimate) load on your Network", Sep. 11, 2002, all pages.*

* cited by examiner

*Primary Examiner* — Kwang B Yao
*Assistant Examiner* — Adam Duda
(74) *Attorney, Agent, or Firm* — Oblon, Spivak, McClelland, Maier & Neustadt, L.L.P.

(57) ABSTRACT

Certain aspects of a method and system for intrusion detection and prevention based on packet type recognition in a network are disclosed. Aspects of one method may include determining a packet type for each of a plurality of received network packets based on at least one of: a header and content of each of the plurality of received network packets. The rate at which the plurality of received network packets are handled at a port in the network switching device may be regulated based on a number of occurrences of the determined packet type of the plurality of received network packets.

25 Claims, 10 Drawing Sheets

METHOD AND SYSTEM FOR INTRUSION DETECTION AND PREVENTION BASED ON PACKET TYPE RECOGNITION IN A NETWORK

CROSS-REFERENCE TO RELATED APPLICATIONS/INCORPORATION BY REFERENCE

This application makes reference to:
U.S. application Ser. No. 11/442,745 filed on May 30, 2006;
U.S. application Ser. No. 11/442,801 filed on May 30, 2006;
U.S. application Ser. No. 11/443,382 filed on May 30, 2006; and
U.S. application Ser. No. 11/442,928 filed on May 30, 2006.

Each of the above stated applications is hereby incorporated herein by reference in its entirety.

FIELD OF THE INVENTION

Certain embodiments of the invention relate to network switches. More specifically, certain embodiments of the invention relate to a method and system for intrusion detection and prevention based on packet type recognition in a network.

BACKGROUND OF THE INVENTION

In a telecommunications network, a switch is a device that channels incoming data from any of a plurality of input ports to at least one output port that will communicate the data toward its intended destination. In the traditional circuit-switched telephone network, one or more switches are used to set up a dedicated temporary connection or circuit for an exchange between two or more parties. On an Ethernet local area network (LAN), a switch determines which output port to forward a particular packet frame based on the medium access control (MAC) address of the received packet frame. In a packet switched IP network, a switch may determine which output port to use to route the network packet based on the IP address of each packet.

Various software algorithms and applications have been developed to discover the topology of a network and detect the presence of loops in a network. Whenever a loop is detected, the traffic on those ports that form the loop may be blocked. A blocked port may not be used to forward traffic since it would result in the forwarded traffic being looped back and subsequently received at the output port from which it was communicated. Standardized protocols such as spanning tree and rapid spanning tree are utilized to detect and prevent occurrences of loops within a network. Such methods for detecting and preventing loops may be referred to as active methods.

A loop generally creates a high concentration of traffic, which excludes other applications from communicating data over the input and output ports that form the loop. If a sufficient amount of switch ports are placed in a loop, this may render the switch inoperable. This may occur in instances where traffic in a loop is also being broadcasted to other ports and may reduce those portions of a network that is served solely by the switch.

A service provider, for example, a server, a print server, a file server and/or an email server that possesses finite resources may be subject to attacks such as denial-of-service (DoS). A distributed denial of service (DDoS) is a popular format in which a potentially large number of compromised machines may be utilized to launch an attack on a server. In a DoS attack, an attacker attempts to force a service provider to allocate resources in a wasteful manner such that legitimate clients are denied service. When a machine or device is connected to a network, transport control protocol (TCP) may be utilized to launch DoS attacks. For example, using TCP, an illegitimate client may establish multiple connections with a server or compromise an intermediary device by requesting the intermediary device to demand a connection to the server. By establishing multiple connections, the illegitimate client may consume server resources that may otherwise be utilized to service legitimate clients, such as running applications or manage network connections. As a result, new legitimate requests may be denied as the server runs out of available resources.

Typical server resources that are attacked may include central processing unit (CPU) bandwidth or CPU power, memory, disk space, network connections, network bandwidths, and quality of service (QoS). In general, service providers strive to identify attacks before they take a toll and disrupt service to legitimate clients. An example of a mitigation scheme for a denial of service attack using connection setup requests is that in some communication systems, a server may place a connection on a "potential open" list without committing its resources until a client commits its own resources later in the connection open process. The consumption of resources on the client side, in order to launch attacks against the server, may limit the number of attacks it may launch against the server.

Some attacks may create a surge of TCP connection setup requests in order to deplete server resources. Since a server consumes resources whenever a connection is accepted, generating a plurality of TCP connection setup request may rapidly deplete server resources. Although a server may have enough resources to simultaneously support, for example, about 10,000 connections, any connection consumed by an attacker may result in a denial of a legitimate connection request. Furthermore, as the number of requested connections increase, the likelihood of denial of service to a legitimate client also significantly increases. Even if an illegitimate connection is not eventually established, an illegitimate connection request consumes valuable CPU bandwidth and memory resources for processing the request, and this may steal resources, which may be better utilized for servicing legitimate requests.

Another popular mode for launching an attack may involve transmitting Internet control message protocol (ICMP) packets at an excessive rate to a server. This may require the server to respond by, for example, transmitting ICMP echo or ping messages. The ICMP is a layer 3 protocol that is integrated with the transport control protocol/Internet protocol (TCP/IP) protocol suite. It allows routers to send error and control messages about packet processing on IP networks. For example, if a packet cannot reach its destination, an ICMP message may be sent to the packet's source to inform it that the packet has not reached its destination. The ICMP messages may report congestion when a router's buffer is full and is unable to properly forward packets. A source quench message may be returned to the data source to slow down packet transmission. Troubleshooting information may also be relayed through an ICMP's echo feature. The ping utility is provides the capability to send a packet roundtrip between hosts.

In instances where a significant amount of ICMP messages are sent at a high rate, the server resources may be consumed to process the ICMP requests and to respond to these requests. If enough resources are consumed, this may eventually result in the denial of service to a legitimate client. A server that processes requests from illegitimate clients wastes resources that may otherwise be reserved and/or utilized by legitimate clients. It is critical to stop these attacks before they affect critical server resources and significantly degrade system performance.

An organization may have an internal network protected from the external world by a firewall, for example. An attack from outside an organization may employ more machines with larger number of different IP addresses than an attack using compromised internal machines that may belong to few subnets. A few machines may be compromised by external or internal attackers, for example, by guessing or stealing passwords that may lead to a large scale attack of internal machines. Such an attack may, in some cases, be limited to a single or few IP subnets, as many machines may be deployed on the same subnet. The filtering required to identify potential attackers may be simplified, once the source of the attack has been identified as relating to these IP subnets. However, each individual attack may be different. For example, attacks may be from a spoofed source IP address and accordingly, the attack may not be found by searching for that repeated address.

An attack may be repetitive in which the same source may try to launch the same attack. The attack may be prevented in the future by knowing the source and blocking it. Another attack type may be from the same source but may address different services, for example, HTTP port, FTP port. An attack may be launched from different source addresses making the learning process difficult, as the server may not be able to identify the attack by its source address alone. The learning process may include identifying the existence of an attack and then identifying the root cause of its source or mechanism.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for intrusion detection and prevention based on packet type recognition in a network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for intrusion detection and prevention based on packet type recognition in a network. Certain aspects of the invention may provide a method and system for determining a packet type for each of a plurality of received network packets based on at least one of: a header and content of each of the plurality of received network packets. The rate at which the plurality of received network packets are handled at a port in the network switching device may be regulated based on a number of occurrences of the determined packet type of the plurality of received network packets. At least a portion of a plurality of additional network packets of the determined packet type received at the port in the network switching device may be dropped, if the determined number of occurrences of the determined packet type of the plurality of incoming packets exceeds a threshold within a time period.

A packet type may be referred to as a class of frames. For example, Internet control message protocol (ICMP) frames, Ethernet multicast or Broadcast frames, an Ethernet frame with a specific frame type value or with a particular virtual local area network (VLAN) ID. The frames that may be rate limited may comprise TCP synchronous (SYN) frames, other transport connection requests, ICMP frames, address resolution protocol (ARP) and reverse address resolution protocol (RARP), one or more of which may be utilized by attacks to change the state of a server. The TCP SYN may be a single bit in a field of six control bits in a TCP header. The SYN bit may be utilized to synchronize sequence numbers in order to ensure that every octet in a given TCP packet may be received and acknowledged. A packet type may be a characteristic that may be present in a frame or a multitude of frames that are, for example, a login request for a protocol. For example, iSCSI or a frame or a group of frames carrying some credential or connection request information. The packet type may comprise a complete field or portions of any of the above fields or any combination of fields or sub fields or wild cards.

Figure 1A:
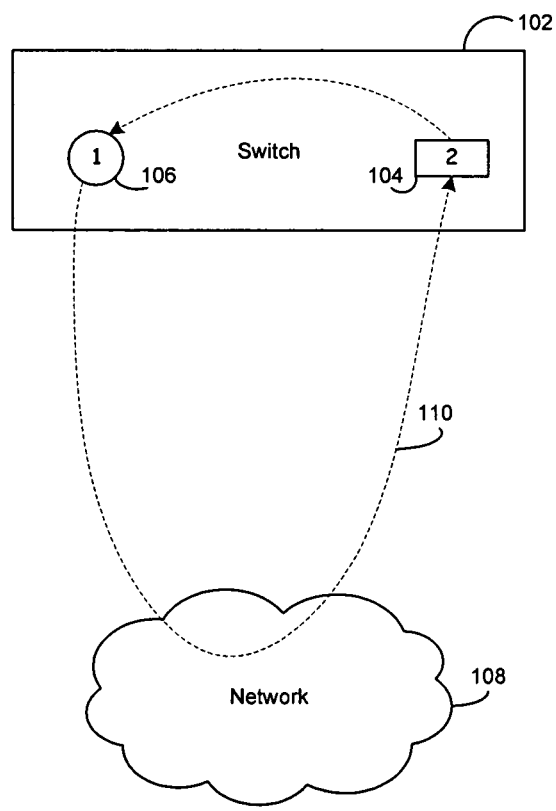
FIG. 1A is a diagram illustrating an exemplary loop in a network that may be utilized in connection with an embodiment of the invention.

FIG. 1A is a diagram illustrating an exemplary loop in a network that may be utilized in connection with an embodiment of the invention. Referring to FIG. 1A, there is shown a packet network switch 102, a network 108 and a network loop data path 110. The packet network switch 102 may comprise an input port 2 104 and an output port 1 106.

The loop 110 illustrates data being communicated from the output port 1 106 of the packet network switch 102 through the network 108 and being received at an input port 2 104 of the packet network switch 102. The same data that is received at the input port 2 104 may be then communicated back to the output port 1 106, thereby creating a loop. A loop 110 may occur when data is transmitted from the first output switch port 106, received at a first input port 104 of the same switch 102 and is communicated back to the first output switch port 106.

In accordance with various embodiments of the invention, a passive methodology may be utilized to detect and handle loops that may occur in a network 108. This may be utilized in instances where the spanning tree or rapid spanning tree algorithm is not running. Each frame handled by the switch 102 may be tracked by a classifier that examines each frame to determine its identity. For example, a hashing operation may be performed across each received frame and the corresponding hash information related to each frame may be stored, for example, in a table in memory. The hash information may be examined to determine whether there are multiple occurrences of the same received frame. The accuracy of the hashing algorithm may adequately detect multiple frame occurrences. If examination of the hashed information indicates that a frame is to be communicated through the switch 102 at a rate that may exceed a threshold or other determined rate, then this may indicate the presence of a loop in the network 108. In most networks, this may be a fair assumption since there would be no value in sending the same information through the switch constantly, except for testing purposes.

Figure 1B:
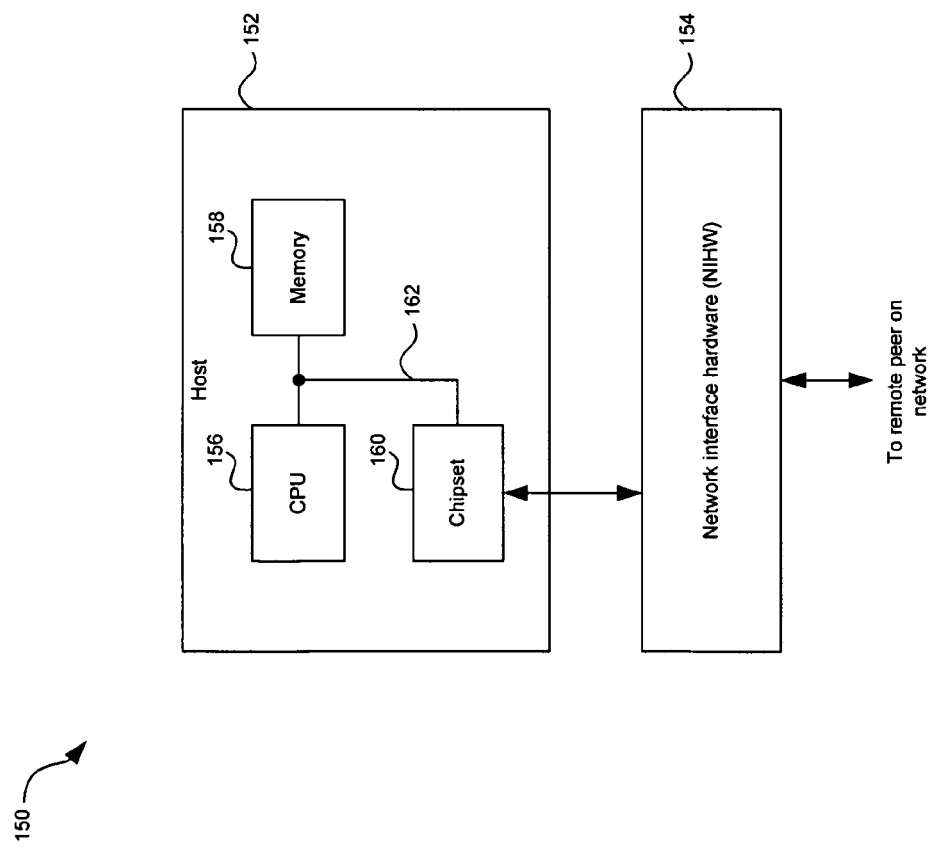
FIG. 1B is a block diagram illustrating a host with a separate network interface hardware (NIHW) block, in accordance with an embodiment of the invention.

FIG. 1B is a block diagram illustrating a host with a separate network interface hardware (NIHW) block, in accordance with an embodiment of the invention. Referring to FIG. 1B, there is shown a networking system 150, such as a server, a client, or a similar network machine, for example, that may comprise a host 152 and a network interface hardware (NIHW) device 154. The host 152 may comprise a central processing unit (CPU) 156, a memory 158, and a chipset 160. The CPU 156, the memory 158, and the chipset 160 may be communicatively coupled via, for example, a bus 162.

The networking system 150 may enable operation or support of various networking protocols. For example, the networking system 150 may enable supporting of transport control protocol/Internet protocol (TCP/IP) connections. In this regard, the networking system 150 may enable supporting of Internet control message protocol (ICMP), address resolution protocol (ARP), stream control transmission protocol (SCTP), and/or path maximum transmission unit (PMTU) discovery protocol, for example. The ICMP protocol may refer to an ISO/OSI layer 3 protocol that may allow routers, for example, to send error and/or control messages about packet processing on IP networks. The ARP protocol may refer to a low-level protocol within the TCP/IP suite that may map IP addresses to corresponding Ethernet addresses. The SCTP may support the transport of public switched telephone networks (PSTN) signaling messages over connectionless packet networks such as IP networks, for example. The PMTU may refer to a maximum unit of data that may be sent given a physical network medium. In other embodiments, SCTP may be used as the transport protocol rather than TCP.

The host 152 may enable setup parameters for network connections. For example, the host 152 may setup transport layer parameters comprising information that support time stamping, window scaling, delayed acknowledgment policy, flow control scheme to be used, congestion handling, selective acknowledgement (SACK), buffers to be used, and/or other transport related parameters. The host 152 may also setup network layer parameters comprising information that supports IPv4 or IPv6, for example, and options such as no fragments and/or hop limit. The host 152 may also setup data link layer parameters comprising information that supports virtual local area networks (VLAN) and source address to be used, for example.

The CPU 156 may comprise suitable logic, circuitry, and/or code that may enable supporting of the management and/or performance of networking operations associated with remote peers or clients on a network. The CPU 156 may also enable supporting of the management and/or performance of service applications that may be provided to the remote clients on the network.

The memory 158 may comprise suitable logic, circuitry, and/or code that may enable storage of information regarding the networking operations and/or service applications supported by the CPU 156. The chipset 160 may comprise suitable logic, circuitry, and/or code that may enable supporting of memory management, PCI master and arbitrator, graphics interface, I/O master for USB, audio, and/or peripheral devices, for example. In this regard, the chipset 160 may comprise at least one integrated circuit (IC) that provides services in support of the CPU 156 operations. In some instances, the services provided by the chipset 160 may be implemented in separate ICs. The choice of one or more ICs for implementing the chipset 160 may be based on the number and/or type of services provided.

The NIHW device 154 may comprise suitable logic, circuitry, and/or code that may enable communication with the host 152. In this regard, the NIHW device 104 may enable communication with the CPU 156, the memory 158, and/or the chipset 160. In some instances, the number of network connections that may be supported by the NIHW device 154 may be different than the number of network connections that may be supported by the host 152. For example, when the host 152 supports 10,000 connections and the NIHW device 154 supports 1,000 connections, then a connection ratio of 10:1 is supported by the networking system 150. In another example, if the host 152 supports 2,000 connections and the NIHW device 104 supports 1,000 connections, then a connection ratio of 2:1 is supported by the networking system 150. The connection ratio of a networking system that comprises a host and an NIHW device may be utilized when determining a connection setup model for a particular application.

Figure 1C:
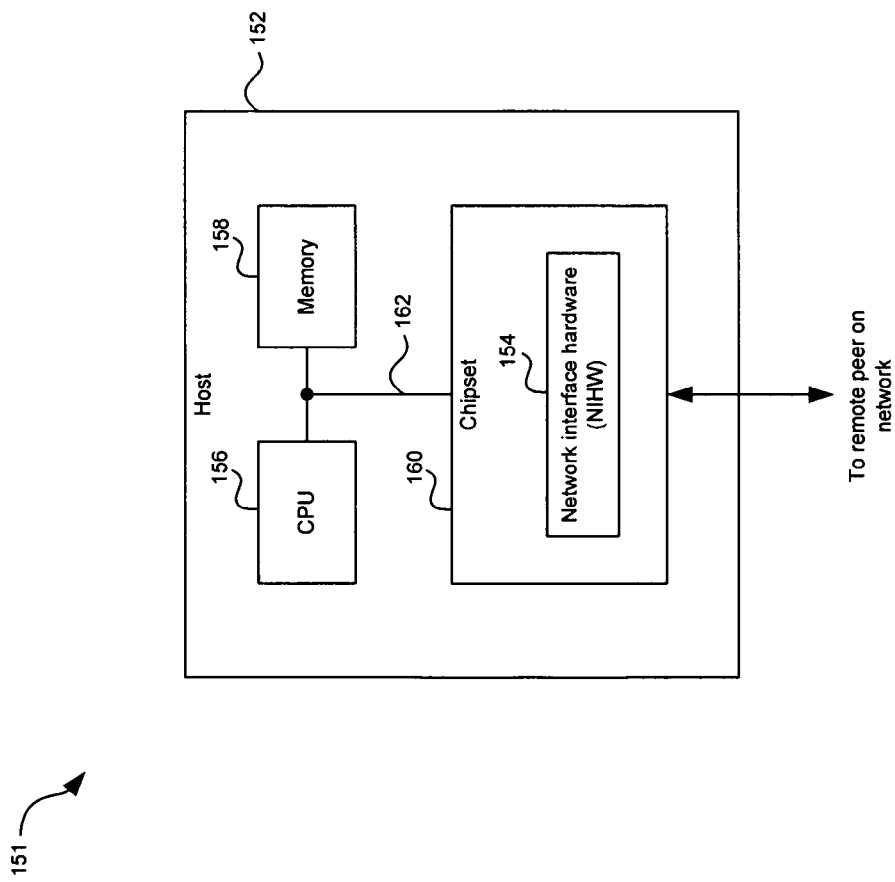
FIG. 1C is a block diagram illustrating a host with a network interface hardware block integrated within a chipset, in accordance with an embodiment of the invention.

FIG. 1C is a block diagram illustrating a host with a network interface hardware block integrated within a chipset, in accordance with an embodiment of the invention. Referring to FIG. 1C, there is shown a networking system 151 that may differ from the networking system 150 in FIG. 1B in that the NIHW device 154 in FIG. 1B is integrated into the chipset 160. In this regard, the NIHW device 154 may enable communication with other portions of the chipset 160, and with the CPU 156, and/or the memory 158 via the bus 162. The NIHW device 154 may comprise a classifier that may enable classification of received network packets.

Figure 1D:
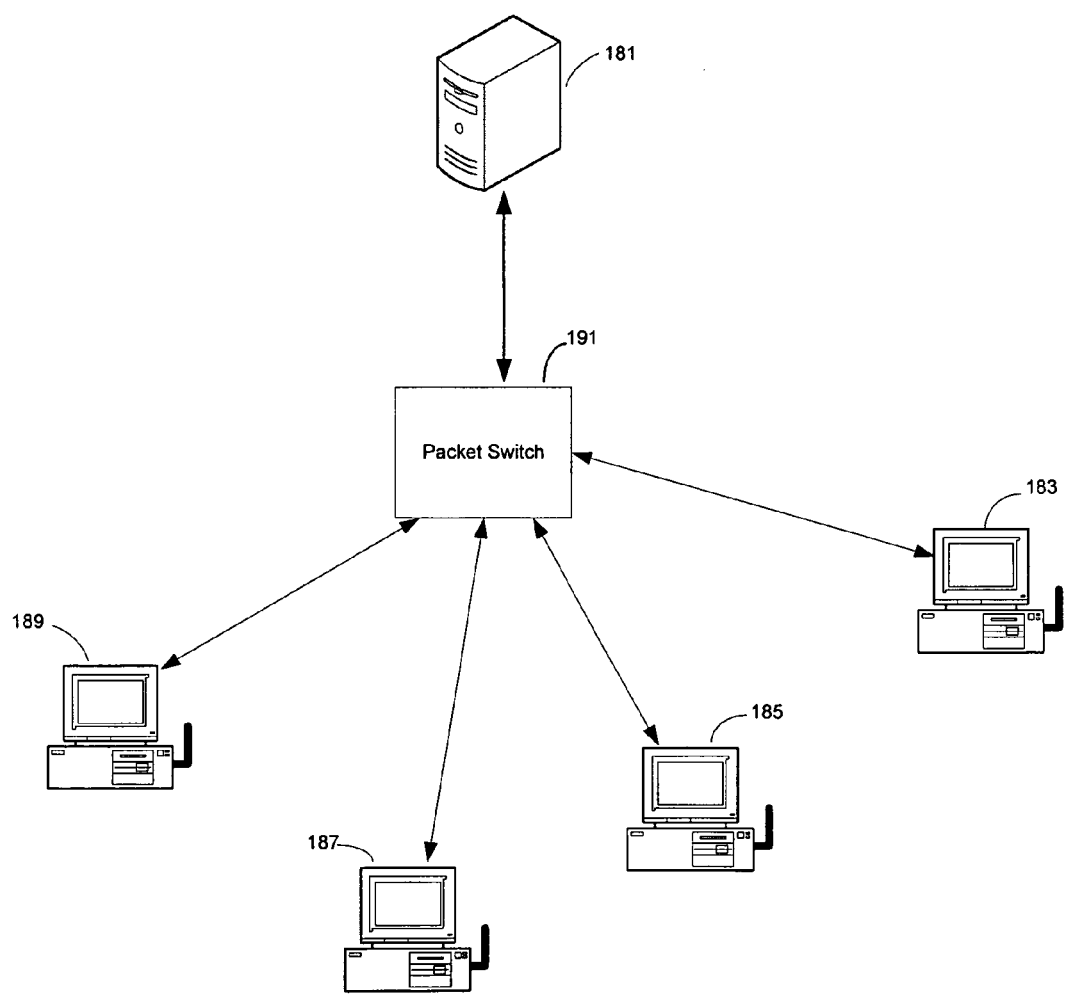
FIG. 1D is a block diagram of an exemplary packet switched network that may be utilized in accordance with an embodiment of the invention.

FIG. 1D is a block diagram of an exemplary packet switched network that may be utilized in accordance with an embodiment of the invention. Referring to FIG. 1D, there is shown a host 181, a packet switch 191, and a plurality of clients, client 183, client 185, client 187 and client 189. The host 181 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

The plurality of clients 183, 185, 187 and 189 may comprise suitable logic, circuitry and/or code that may be located on the premises of a customer, for example, data termination equipment such as routers. The packet switch 191 may comprise suitable logic, circuitry and/or code that may be enabled to provide clocking and switching services in a network. The plurality of clients 183, 185, 187 and 189 may be coupled to the packet switch 191 by a physical layer component and a link layer component. The physical layer component may define the mechanical, electrical, functional, and procedural specifications for the connection between the devices, for example, the RS-232 specification. The link layer component may define the protocol that establishes the connection between the plurality of clients 183, 185, 187 and 189 and the packet switch 191.

The host 181 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

Figure 2:
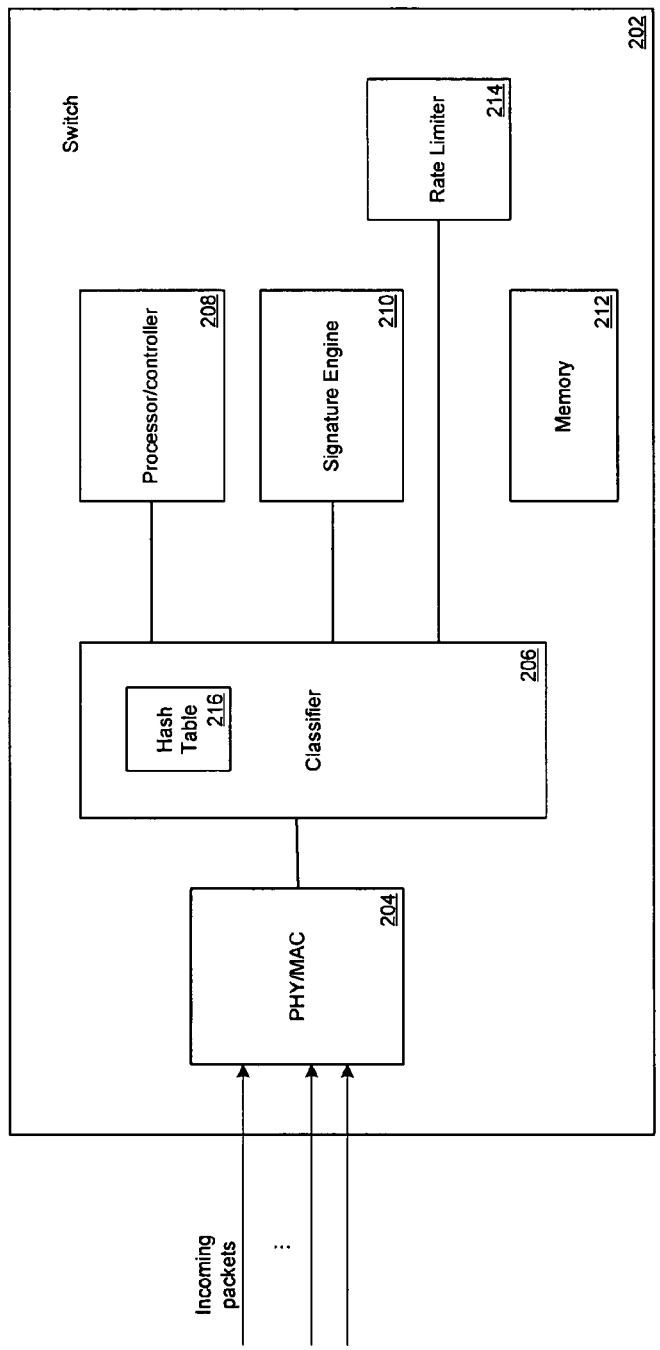
FIG. 2 is a diagram that illustrates a system for passive loop detection and prevention, in accordance with an embodiment of the invention.

FIG. 2 is a diagram that illustrates a system for passive loop detection and prevention, in accordance with an embodiment of the invention. Referring to FIG. 2, there is shown a switch 202. The switch 202 comprises a physical (PHY)/(medium access control) MAC layer block 204, a packet classifier 206, a processor/controller 208, a signature engine 210, a rate limiter 214 and a memory 212. The packet classifier 206 may comprise a hash table 216.

The PHY/MAC layer block 204 may comprise suitable logic, circuitry and/or code that may enable managing and maintaining of communications between base stations by coordinating access to a shared channel, for example, a wired channel or a wireless channel and utilizing protocols that enhance communications over a network medium. The PHY/MAC layer block 204 may receive the incoming network packets and may output the received packets to the classifier 206.

The packet classifier 206 may comprise suitable logic, circuitry and/or code that may enable classification of received network packets. There is an increased likelihood of having collisions between the received network packets if, for example, a 4 byte cyclic redundancy check (CRC) is utilized, due to the limited number of bits being used. A 64 byte CRC may be utilized to reduce the likelihood of collisions between the network packets. To further decrease the likelihood of collisions, the CRC may be combined with other packet information to generate CRC-like hash information. A CRC is a type of hash function used to produce a checksum, which is a small, fixed number of bits against a block of data, such as a packet of network traffic. The checksum may be used to detect and correct errors after transmission or storage. A CRC may be computed and appended before transmission or storage, and verified afterwards by a recipient in order to confirm that no changes have occurred to the block of data during transmission.

The hash table 216 may be utilized to track a finite number of connection flows. For example, hashed entries for 5000 connection flows may be tracked and once the hash table is filled, a FIFO mechanism may be utilized to purge or eliminate older entries from the hash table in order to make space for newly hashed entries. The hash table 216 may be a data structure that associates keys with values. The hash table 216 may support lookup operations by transforming the key using a hash function into a hash, a number that the hash table 216 uses to locate the desired value.

The processor 208 may comprise suitable logic, circuitry, and/or code that may enable supporting of the management function to keep track of connections or traffic flows at the macro-level state. The macro-level state may indicate that only partial context information is maintained for each connection.

The signature engine 210 may comprise suitable logic, circuitry and/or code that may enable examining of the packets for each connection flow and generate various keys based on the hashed values of the CRC, for example. The signature engine 210 may be enabled to detect the type of packet by examining the header and the content of the incoming packet. Only a portion of the incoming network packet frame may be necessary to detect the type of packet. The signature engine 210 may enable determining whether the determined packet type of the plurality of received network packets matches with a packet type stored in a hash table 216 or may utilize exact matching techniques such as a ternary content addressable memory (TCAM) for fast pattern matching of packet types.

The rate limit engine 214 may comprise suitable logic, circuitry and/or code that may provide an enforcement function to limit a rate of various connections to a specified rate based on results from the packet classifier 206. It may be more efficient to throttle back a data rate that is associated with a connection than terminating a connection associated with a loop. For example, if a loop is detected for a particular connection, the rate limiter 214 may enable reduce a transmission rate of the connection from a million frames per second to 500 frames per second, for example.

The memory 212 may comprise suitable logic, circuitry and/or code that may enable storage of hash information used for generating the CRC or CRC-type hash information. There may be a tradeoff between accuracy and the amount of memory that is required to store hash information used for generating the CRC or CRC-type hash information.

Figure 3A:
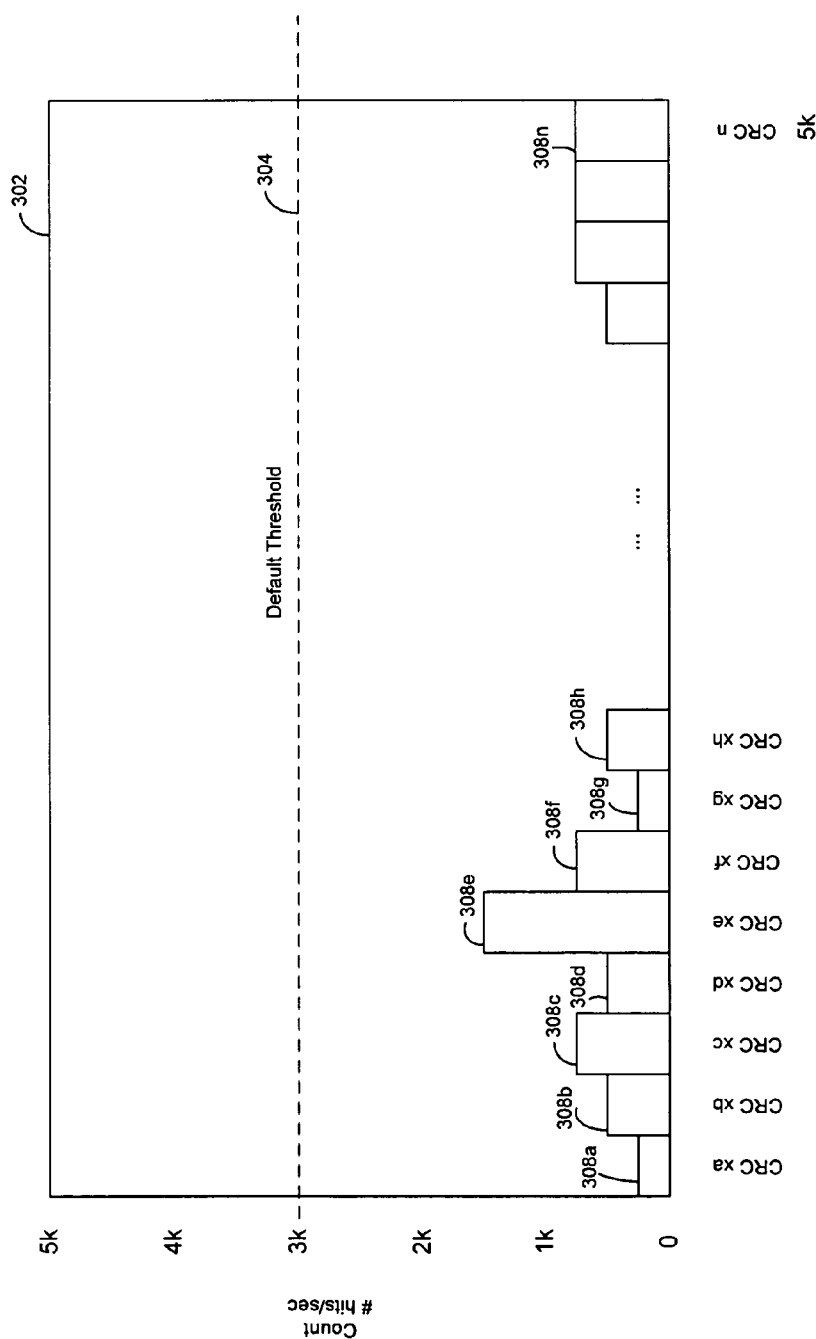
FIG. 3A is a diagram that illustrates an exemplary management function, in accordance with an embodiment of the invention.

FIG. 3A is a diagram that illustrates an exemplary management function, in accordance with an embodiment of the invention. Referring to FIG. 3A, there is shown a graph 302 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, . . . , CRC n. The vertical axis illustrates the count for each of the corresponding occurrences of the hashed CRC values CRC xa 308a, CRC xb 308b, CRC xc 308c, CRC xd 308d, CRC xe 308e, CRC xf 308f, CRC xg 308g, CRC xh 308h, . . . , CRC n 308n. Initially, the hash table may be populated with CRC hash entries until it is full. FIG. 3A illustrates a steady state condition in which there are 5000 entries in the hash table, for example. There is a default threshold 304 of 3000 packets per second, for example. Once the hash table is full, various mechanisms may be utilized to purge or otherwise remove entries from the hash table to make room for newly generated hash entries. For example, a FIFO mechanism may be utilized to remove hash entries. In this regard, the oldest entries in the hash table may be purged or otherwise removed first to make room for the newly generated CRC hash entries.

The first time a particular CRC hash is generated; it may be entered in the hash table with a count of 1. The second time that same CRC hash is generated; the count for that CRC hash entry may be incremented. Subsequent occurrences may result in the count for that CRC hash entry being incremented. In one embodiment of the invention, a threshold may be established for the CRC hash entries. If the rate of the packets exceeds an established threshold, then this may trigger an action such as a reduction in the data rate or terminating the connection.

Figure 3B:
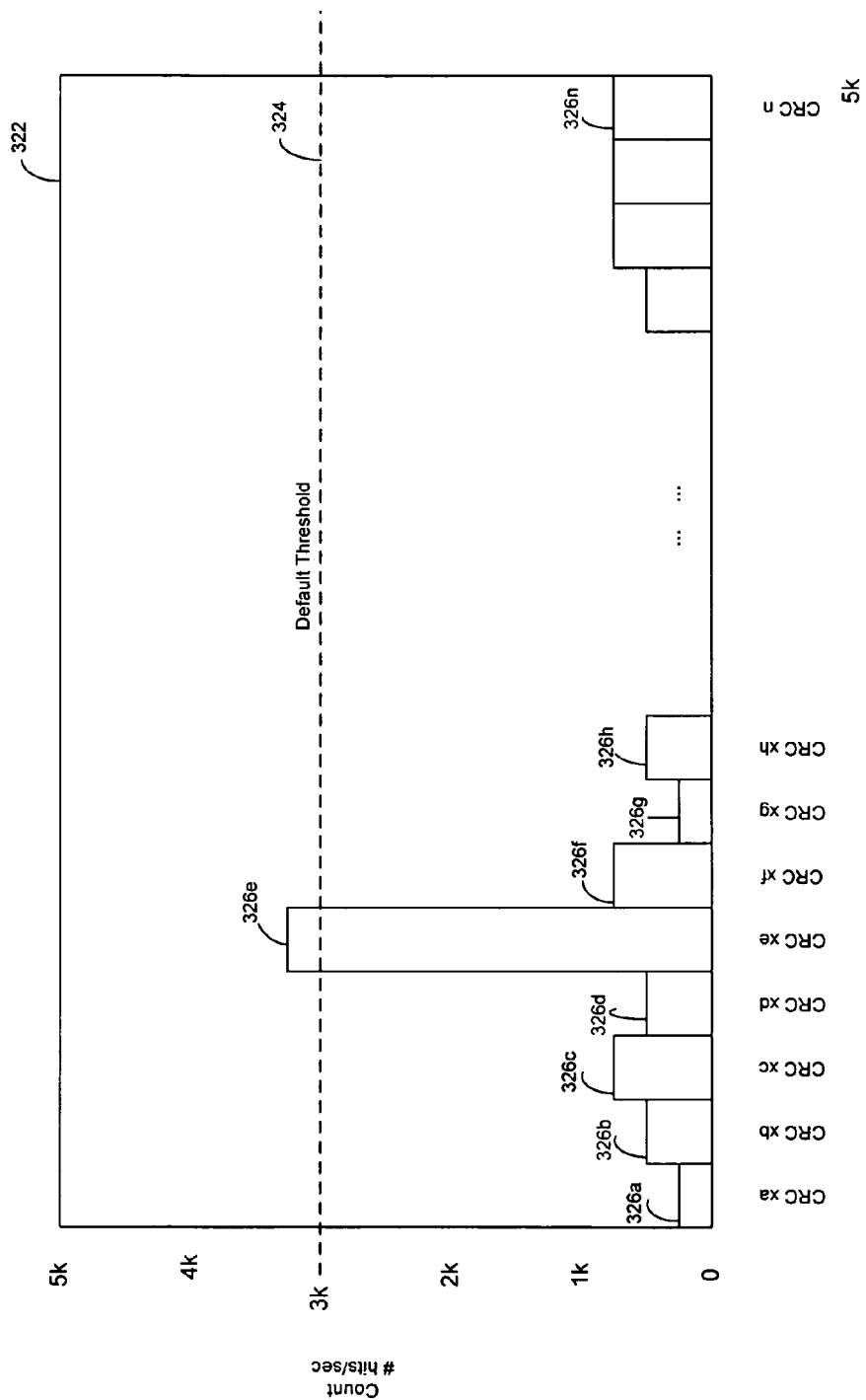
FIG. 3B is a diagram that illustrates an exemplary scenario of a management function in which the default threshold has been exceeded, in accordance with an embodiment of the invention.

FIG. 3B is a diagram that illustrates an exemplary scenario of a management function in which the default threshold has been exceeded, in accordance with an embodiment of the invention. Referring to FIG. 3B, there is shown a graph 322 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, . . . CRC n. The vertical axis illustrates the count for each of the corresponding occurrences of the hashed CRC values CRC xa 326a, CRC xb 326b, CRC xc 326c, CRC xd 326d, CRC xe 326e, CRC xf 326f, CRC xg 326g, CRC xh 326h, . . . , CRC n 326n.

FIG. 3B illustrates an exemplary scenario in which the number of occurrences of CRC xe 326e exceeds the default threshold 324. Once a threshold has been exceeded, then at least one of a plurality of actions may be triggered and executed by either the rate limiter 214 (FIG. 2) and/or the processor 208. These actions may comprise rate limiting, sending a management alarm, disabling one or more ports handling traffic in a loop, providing a visual or aural indication, and/or CPU redirect, for example.

A visual indication may comprise blinking a LED and an aural indication may comprise generating a beep. The blinking associated with a particular connection of the LED may follow a predefined sequence, for example. Rate limiting may involve blocking or dropping packets. With processor redirect, a copy of information in the hash table along with other connection context information may be copied or otherwise provided to the processor 208 for further analysis. Based on this analysis, the processor 208 may then determine how best to handle the condition and take appropriate actions. The processor 208 may provide an indication to the rate limiter 214, which may instruct the rate limiter 214 to adjust a rate of the corresponding connection accordingly. Context information such as a source port and a destination port, which may be associated with the hash entry for a particular packet, may be utilized to control a port. For example, the rate limiter 214 may use the source port or destination port to limit the data rate of the port or to disable the port.

Figure 3C:
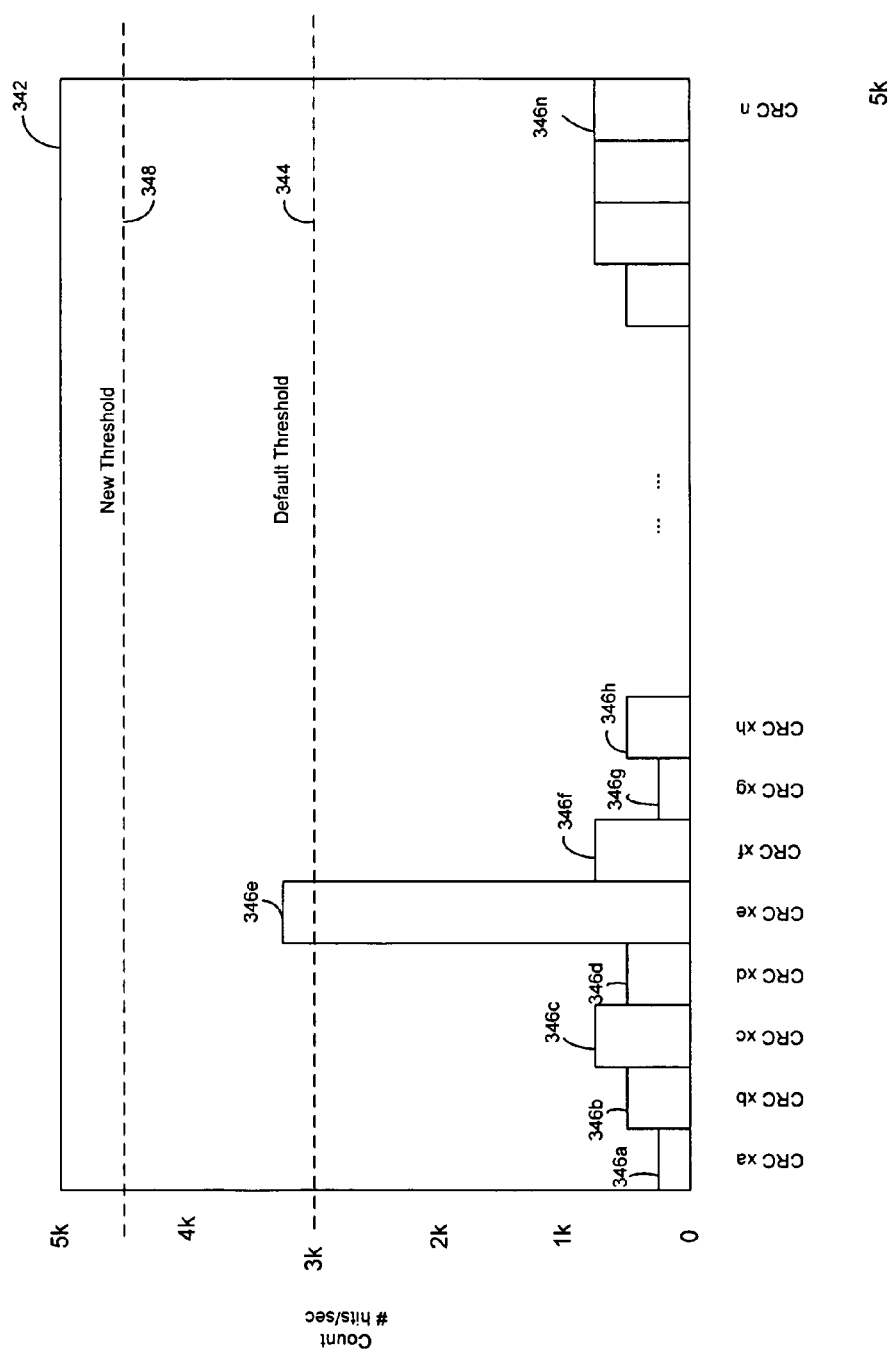
FIG. 3C is a diagram that illustrates an exemplary scenario of a management function with an adaptive threshold, in accordance with an embodiment of the invention.

FIG. 3C is a diagram that illustrates an exemplary scenario of a management function with an adaptive threshold, in accordance with an embodiment of the invention. Referring to FIG. 3C, there is shown a graph 342 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, . . . , CRC n. The vertical axis illustrates the count for each of the corresponding occurrences of the hashed CRC values CRC xa 346a, CRC xb 346b, CRC xc 346c, CRC xd 346d, CRC xe 346e, CRC xf 346f, CRC xg 346g, CRC xh 346h, . . . , CRC n 346n. The number of occurrences of CRC xe 346e exceeds the default threshold 344. A new threshold 348 may be implemented at 4500 hits, for example, by the management function.

In this regard, the threshold may be dependent on the type of traffic handled by the connection. For example, if the traffic is largely multimedia traffic, and it is known that this type of environment is prone to loops, then the threshold may be increased to a higher level to more efficiently handle this type of traffic. For example, the threshold may be increased from 3000 to 4500, for example. At least one of a plurality of actions may be taken when a threshold has been reached. A default action may comprise executing a rate limiting action once a threshold has been exceeded. In certain instances, it may be appropriate to drop packets.

In another embodiment of the invention, the type of application running or the type of frame that is being detected may affect the action that may be taken by the processor 208 and/or the rate limiter 214. For example, if a frame is a unicast frame, the threshold may be changed and/or the count modified to favor acceptance of these types of frames. For example, in the case of a unicast frame, the count may be incremented by, for example, every 5 unicast frames for a particular CRC hash value. However, if the frame is a broadcast frame, then the threshold and/or count may be modified to disfavor the acceptance of these types of frames.

Figure 4:
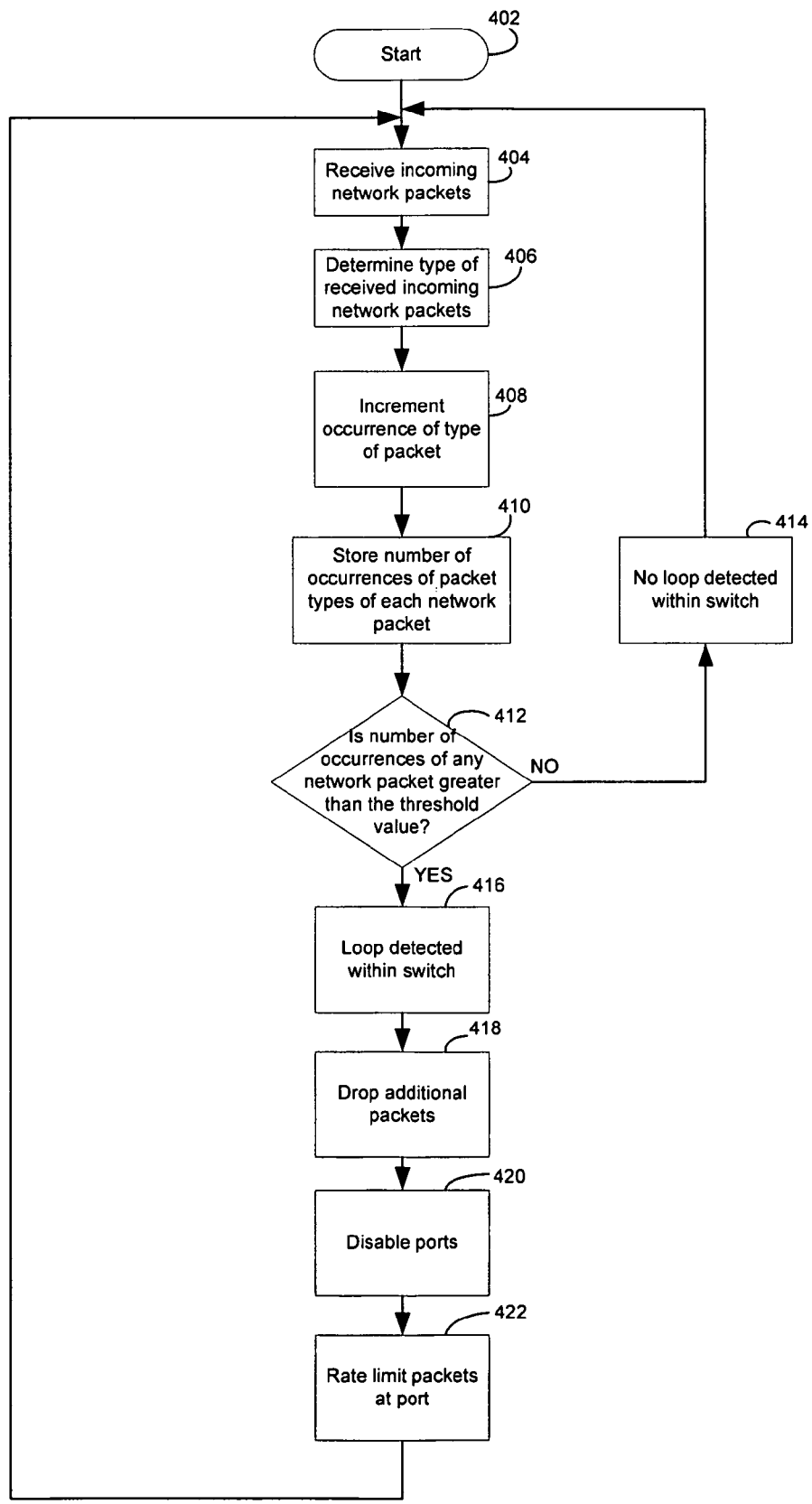
FIG. 4 is a flowchart illustrating a method for intrusion detection and prevention based on packet type recognition, in accordance with an embodiment of the invention.

FIG. 4 is a flowchart illustrating a method for intrusion detection and prevention based on packet type recognition, in accordance with an embodiment of the invention. Referring to FIG. 4, exemplary steps may begin at step 402. In step 404, a plurality of network packets may be received at a port in a switching device. In step 406, the type of at least a portion of the plurality of received packets may be determined. In step 408, the number of occurrences of a particular packet type may be incremented. In step 410, the number of occurrences of a particular packet type may be stored in memory. In step 412, it may be determined whether the number of occurrences of the packet type of any of the plurality of received network packets is greater than a set threshold value. If the number of occurrences of a particular packet type of at least one of the plurality of received network packets is not above the set threshold value, control passes to step 414. In step 414, it may be indicated that no loop within the switch is detected. Control then returns to step 404. If the number of occurrences of a particular packet type of at least one of the plurality of received network packets is above a set threshold value, control passes to at least one of steps 418, 420, 422, or 424.

In step 418, the rate of at least a portion of the plurality of received network packets at a port in a switching device may be adjusted, for example, by the rate limiter 214 (FIG. 2). Rate limiting may involve blocking or dropping packets and/or otherwise controlling a rate at which certain types of packets may be handled, for example. In step 420, at least one of a plurality of ports handling at least one of the plurality of received network packets may be disabled. In step 422, a visual indication, for example, a blinking LED or an aural indication comprising generating a beep may be transmitted to the processor 208. In step 424, a copy of information in the hash table along with other connection context information may be copied or otherwise provided to the processor 208 for further analysis. Based on this analysis, the processor 208 may then determine how best to handle the condition and take appropriate actions. The processor 208 may provide an indication to the rate limiter 214, which may instruct the rate limiter 214 to adjust a rate of the corresponding connection accordingly. Control then returns to step 404.

Figure 5:
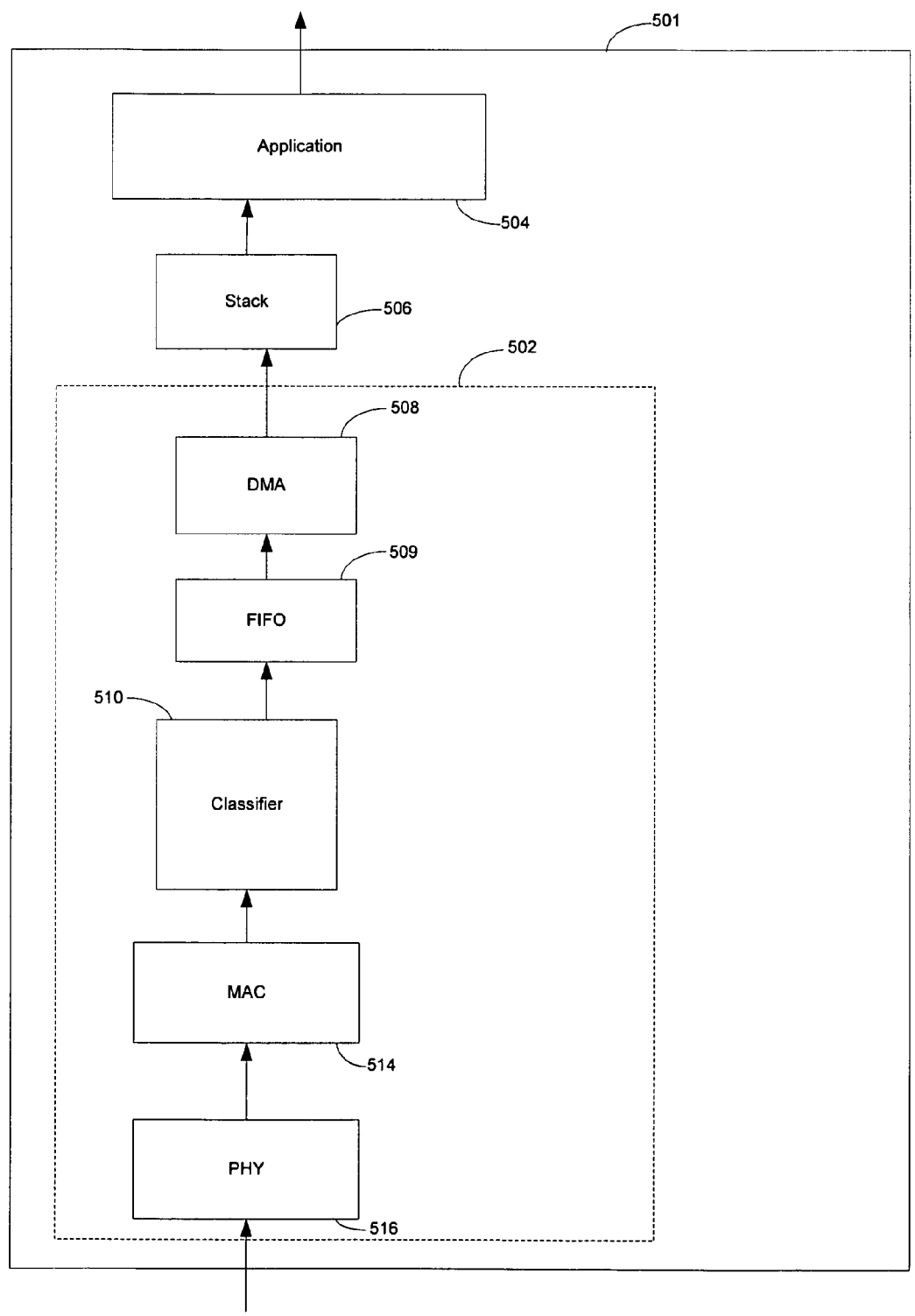
FIG. 5 is a block diagram of exemplary hardware with a network interface controller (NIC) for intrusion detection and prevention based on packet type recognition, in accordance with an embodiment of the invention.

FIG. 5 is a block diagram of exemplary hardware with a network interface controller (NIC) for intrusion detection and prevention based on packet type recognition, in accordance with an embodiment of the invention. Referring to FIG. 5, there is shown a host 501. The host 501 may comprise an application block 504, a networking stack 506 and a network interface controller (NIC) block 502. The NIC 502 may comprise a direct memory access (DMA) block 508, a first in first out (FIFO) buffer block 509, a classifier block 510, a medium access control (MAC) layer block 514 and a physical (PHY) layer block 516.

The network interface controller (NIC) 502 may comprise suitable logic, circuitry and/or code that may be utilized to connect a workstation to a local area network (LAN), for example. The NIC 502 may be enabled to transfer data from a host 501 or host resident application 504 or host resident communications stack 506, format it into a specific packet format required by the LAN protocol, for example, Ethernet or a higher layer protocol and transfer it to a shared medium via a cable, for example. The DMA block 508 may comprise suitable logic, circuitry and/or code that may be enabled to transfer data from a storage device or a LAN interface controller directly to random access memory (RAM), which speeds up processing of data. The FIFO buffer 509 may comprise suitable logic, circuitry and/or code that may be enabled to employ a buffering scheme to store network packets until they are placed in the host RAM by the DMA 508. The FIFO buffer 509 may be coupled to the DMA block 508, and the classifier block 510.

The classifier block 510 may comprise suitable logic, circuitry and/or code that may be enabled to determine the connection identifier and/or a packet type for each packet. The classifier block 510 may screen out requests from known or suspected illegitimate clients by dropping certain packets based on type and/or a connection identifier. The classifier block 510 may also limit the rate of certain requests based on packet type and/or connection identifier. In an embodiment of the invention, the classifier block 510 may also rate limit packets based solely on the packet type.

The MAC layer block 514 may comprise suitable logic, circuitry and/or code that may be enabled to control access to a medium that may be shared between two or more entities. The MAC layer block 514 may comprise a MAC address that is unique to each NIC. The MAC layer block 514 may be enabled to encode and decode data packets into bits. The MAC layer block 514 may be enabled to furnish transmission protocol knowledge and management and may handle errors in the physical layer, flow control and frame synchronization. The MAC layer block 514 may control how a computer on the network gains access to the data and permission to transmit it. The physical layer (PHY) block 516 may provide for transmission of information over a physical medium connecting two devices. The PHY layer block 516 may transmit a bit stream, for example, an electrical impulse, light or radio signal through the network at the electrical and mechanical level. The PHY layer block 516 provides the hardware for sending and receiving data on a carrier, for example, cables.

In accordance with an embodiment of the invention, a server may opt to limit its new connection acceptance rate or the number of suspected frames of a known profile, for example, internet control message protocol (ICMP) in order to make sure that attacks may not disrupt its service level to legitimate clients. The communication stack 506 may also run one or more heuristic algorithms, which may be adapted to screen the connection requests and deny known attacks or suspicious requests. This code may be adapted to reflect any known attack.

In an embodiment of the invention, the incoming network packets may be identified to be associated with a connection such as a connection request, a connection tear down request, or a connection reset, for example. In the case of a connection request, the host 501 may allow 400 connection requests per second, for example. On the other hand, the host 501 may allow 1000 connection teardown requests per second, for example. In the case of a connection reset, the host 501 may allow 1500 connections per second, for example. The Internet control message protocol (ICMP) messages and PING messages may be limited to 500 messages per second, for example, as a flood of incoming messages may disrupt service to legitimate clients. A policy may be created that disallows web traffic, or 0 packets per second for web-based traffic, for example.

In an embodiment of the invention, a plurality of policies may be implemented to more accurately detect specific types of packets for intrusion detection systems (IDS) and intrusion prevention systems (IPS) by examining the header of the incoming network packets rather than by a CRC hash. It may be determined at the protocol level, whether an incoming network packet is a file transfer protocol (FTP) connection request or an FTP reset connection request. In this regard, the FTP connection request may be limited to a first rate and the FTP reset connection request may be limited to a second rate in which the second rate may be much higher than the first rate, for example. This may be performed to minimize the effect of unwanted FTP connection requests that may disrupt service.

In another embodiment of the invention, a plurality of policies may be implemented to control the flow of network packets on a port by port basis. For example, input port 2 104 may be allowed to handle 100 ICMP packets per second, for example. If that is exceeded, the additional packets may automatically be dropped. In an exemplary embodiment of the invention, a policy may be implemented, which specifies that for particular ports, if a given threshold is exceeded, then control may be passed to the processor 208 to consider additional factors in order to determine whether the threshold may be temporarily increased. If, for example, a remote client performs a million pings per second, then a policy may be implemented that temporarily disables the associated incoming port.

In accordance with an embodiment of the invention, a method and system for intrusion detection and prevention based on packet type recognition in a network may comprise a signature engine 210 that enables determining a packet type for each of a plurality of received network packets based on at least one of: a header and content of each of the plurality of received network packets. The rate limiter 214 and the processor 208 may enable regulating a rate at which the plurality of received network packets are handled at a port in the network switching device 102 based on a number of occurrences of the determined packet type of the plurality of received network packets. The system may enable determining whether a number of occurrences of the determined packet type of the plurality of received network packets exceed a threshold value within a time period. The processor 208 may enable dropping at least a portion of a plurality of additional network packets of the determined packet type received at the port in the network switching device 102, if the determined number of occurrences of the determined packet type of the plurality of incoming packets exceeds a threshold within a time period. The processor 208 may disable at least one of a plurality of ports in the network switching device 102 handling at least one of the plurality of received network packets, if the determined number of occurrences of the determined packet type of the plurality of incoming packets exceeds a threshold within a time period. The signature engine 210 may enable determining whether the determined packet type of the plurality of received network packets matches with a packet type stored in memory. For example, signature engine 210 may enable determining whether the determined packet type of the plurality of received network packets matches with a packet type stored in a hash table 216 or may utilize exact matching techniques such as a ternary content addressable memory (TCAM) for fast pattern matching of packet types. The rate limiter 214 may enable regulating the rate at which the plurality of received network packets are handled at a port in the network switching device 102, if the determined packet type of the plurality of received network packets matches with a packet type stored in a hash table 216. The port in the switching device 102 may be an input port, for example, port 2 104 or an output port, for example, port 1 106.

Another embodiment of the invention may provide a machine-readable storage, having stored thereon, a computer program having at least one code section executable by a machine, thereby causing the machine to perform the steps as described above for intrusion detection and prevention based on packet type recognition in a network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in a communication network, the method comprising:
performing by one or more processors, one or more circuits, or any combination thereof:
determining a packet type for each of a plurality of network packets received by a network switching device based on a portion of content of each of said plurality of received network packets; and
blocking at least a portion of said plurality of received network packets at an input port to regulate a rate at which network packets of said determined packet type are handled at said input port based on information relating to a number of occurrences of said determined packet type that occur within a time period, wherein said information is based on said determined packet type.

2. The method according to claim 1, wherein said information comprises a determination of whether said number of occurrences of said determined packet type has exceeded a threshold value within said time period, wherein said threshold value is set based on said determined packet type.

3. The method according to claim 2, comprising if said determined number of occurrences of said determined packet type exceeds said threshold value within said time period, blocking at least a portion of a plurality of additional network packets of said determined packet type received at said input port in said network switching device.

4. The method according to claim 2, comprising if said determined number of occurrences of said determined packet type exceeds said threshold value within said time period, disabling at least one of a plurality of ports in said network switching device handling at least one of said plurality of received network packets.

5. The method according to claim 2, wherein said input port is disabled to block said portion of said received packets.

6. The method according to claim 1, comprising determining whether said determined packet type matches with a packet type stored in memory.

7. The method according to claim 6, comprising if said determined packet type matches with said packet type stored in said memory, regulating a rate at which said received network packets of said determined packet type are handled at a plurality of ports in said network switching device.

8. The method according to claim 1, comprising determining said packet type for each of said plurality of received network packets based on a portion of a header of each of said plurality of received network packets.

9. A non transitory computer readable medium having stored thereon, a computer program having at least one code section for handling data in a communication network, the at least one code section being executable by a computer for causing the computer to perform steps comprising:
determining a packet type for each of a plurality of-network packets received by a network switching device based on a portion of content of each of said plurality of received network packets; and
regulating a rate at which said plurality of received network packets are handled by blocking packets at an input port in said network switching device based on information relating to a number of occurrences of said determined packet type that occur within a time period, wherein said information is based on said determined packet type.

10. The non transitory computer readable medium according to claim 9, wherein said information comprises a determination of whether said number of occurrences of said determined packet type has exceeded a threshold value within said time period, wherein said threshold value is set based on said determined packet type.

11. The non transitory computer readable medium according to claim 10, wherein said at least one code section comprises code for dropping at least a portion of a plurality of additional network packets of said determined packet type received at said input port in said network switching device, if said determined number of occurrences of said determined packet type exceeds said threshold value within said time period.

12. The non transitory computer readable medium according to claim 10, wherein said at least one code section comprises code for disabling at least one of a plurality of ports in said network switching device handling said at least one of said plurality of received network packets, if said determined number of occurrences of said determined packet type exceeds said threshold value within said time period.

13. The non transitory computer readable medium according to claim 10, wherein said at least one code section comprises code for determining whether to temporarily increase the threshold.

14. The non transitory computer readable medium according to claim 9, wherein said at least one code section comprises code for determining whether said determined packet type matches with a packet type stored in memory.

15. The non transitory computer readable medium according to claim 14, wherein said at least one code section comprises code for regulating said rate at which said plurality of received network packets of said determined packet type are handled at said input port in said network switching device, if said determined packet type matches with said packet type stored in said memory.

16. The non transitory computer readable medium according to claim 9, wherein said at least one code section comprises code for determining said packet type for each of said plurality of received network packets based on a portion of a header of each of said plurality of received network packets.

17. A system for handling data in a communication network, the system comprising:
one or more circuits that are operable to determine a packet type for each of a plurality of network packets received by a network switching device based on a portion of content of each of said plurality of received network packets; and
said one or more circuits are operable to regulate a rate at which said plurality of received network packets are handled at an output port in said network switching device based on information relating to a number of occurrences of said determined packet type that occur within a time period, wherein said information is based on said determined packet type.

18. The system according to claim 17, wherein said information comprises a determination of whether said number of occurrences of said determined packet type has exceeded a threshold value within said time period, wherein said threshold value is set based on said determined packet type.

19. The system according to claim 18, wherein said one or more circuits are operable to drop at least a portion of a plurality of additional network packets of said determined packet type at said output port in said network switching device, if said determined number of occurrences of said determined packet type exceeds said threshold value within said time period.

20. The system according to claim 17, wherein said one or more circuits are operable to determine whether said determined packet type matches with a packet type stored in memory.

21. The system according to claim 20, wherein said one or more circuits are operable to regulate said rate at which said plurality of received network packets of said determined network type are handled at said output port in said network switching device, if said determined packet type matches with said packet type stored in said memory.

22. The system according to claim 17, wherein said network switching device comprises a network switch.

23. The system according to claim 17, wherein said one or more circuits are operable to determine said packet type for each of said plurality of received network packets based on a portion of a header of each of said plurality of received network packets.

24. A system for handling data in a communication network, the system comprising:
one or more circuits that are operable to determine a packet type for each of a plurality of received network packets based on a portion of content of each of said plurality of received network packets;
said one or more circuits are operable to regulate a rate at which said plurality of received network packets are handled at a port in a network switching device based on information relating to a number of occurrences of said determined packet type that occur within a time period, said information comprising a determination of whether said number of occurrences of said determined packet type has exceeded a threshold value within said time period, said threshold value based on said determined packet type; and
said one or more circuits are operable to disable at least one of a plurality of ports in said network switching device handling at least one of said plurality of received network packets, if said determined number of occurrences of said determined packet type exceeds said threshold value within said time period.

25. The system according to claim 24, wherein said at least one of said plurality of ports includes said output port.

* * * * *